United States Patent

Ching-Hui et al.

(10) Patent No.: US 8,300,041 B2
(45) Date of Patent: Oct. 30, 2012

(54) LCD DISPLAY AND BACKLIGHT APPARATUS AND DRIVING METHOD THEREOF

(75) Inventors: Chou Ching-Hui, Tainan County (TW); Mao Li-Wei, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 1124 days.

(21) Appl. No.: 11/774,251

(22) Filed: Jul. 6, 2007

(65) Prior Publication Data

US 2008/0012845 A1 Jan. 17, 2008

(30) Foreign Application Priority Data

Jul. 14, 2006 (TW) .............................. 95125796 A

(51) Int. Cl.
*G09G 5/00* (2006.01)
(52) U.S. Cl. .................. 345/213; 345/204; 345/212
(58) Field of Classification Search ............ 345/76, 345/84, 87–95, 204–215
See application file for complete search history.

(56) References Cited

U.S. PATENT DOCUMENTS

| | | | | |
|---|---|---|---|---|
| 5,576,601 A * | 11/1996 | Koenck et al. | .............. | 315/169.3 |
| 7,394,441 B2 * | 7/2008 | Lee | .................. | 345/76 |
| 7,592,981 B2 * | 9/2009 | Maeda | .............................. | 345/76 |
| 2005/0093792 A1 * | 5/2005 | Yamamoto et al. | .............. | 345/83 |
| 2005/0151716 A1 * | 7/2005 | Lin | ................. | 345/102 |
| 2005/0218835 A1 | 10/2005 | Suzunaga et al. | | |
| 2006/0125736 A1 * | 6/2006 | Lee | .................. | 345/76 |
| 2007/0152934 A1 * | 7/2007 | Maeda | .............................. | 345/92 |
| 2007/0257645 A1 | 11/2007 | Nishino | | |

FOREIGN PATENT DOCUMENTS

| | | |
|---|---|---|
| JP | 5136461 A | 6/1993 |
| JP | 2000252521 A | 9/2000 |
| WO | 2006018923 A1 | 2/2006 |

* cited by examiner

*Primary Examiner* — Vijay Shankar
(74) *Attorney, Agent, or Firm* — Lowe Hauptman Ham & Berner LLP

(57) ABSTRACT

The backlight apparatus includes a light source module having a plurality of light sources connected in series, and a power supply module which generates a driving signal for driving the light source module according a synchronous control signal. A first switch is disposed between the light source module and power supply module, or between a last light source in the light source module and a reference voltage level. The first switch is turned on or off according to the synchronous control signal. In addition, a second switch determines whether or not to couple a function terminal of the power supply module to the reference voltage level to disable the driving signal without power off according to the synchronous control signal.

13 Claims, 4 Drawing Sheets

LCD DISPLAY AND BACKLIGHT APPARATUS AND DRIVING METHOD THEREOF

This application claims the benefit of Taiwan application Serial No. 95125796 filed Jul. 14, 2006, the subject matter of which is incorporated herein by reference.

BACKGROUND OF THE INVENTION

1. Field of the Invention

The present invention generally relates to a driving method of a light source, in particular, to a driving method of a light source in a backlight apparatus.

2. Description of Related Art

FIG. 1 is a block diagram illustrating the internal circuit of a conventional backlight apparatus. Referring to FIG. 1, the conventional backlight apparatus 100 includes a light source module 110 which is composed of a plurality of light sources 112, such as light emitting diodes (LEDs). The light sources 112 are connected in series, and the last light source is grounded via a resistor 114.

A power supply module 130 may further be disposed in the conventional backlight apparatus 100, wherein the power supply module 130 generates a driving current I1 for driving the light source module 110 according to a feedback voltage of the light source module 110. A switch 140 is disposed between the power supply module 130 and the light source module 110. This switch 140 determines, in accordance with a control signal Vp whether or not to conduct the driving current I1 to the light source module 110 to allow the light source module 110 to emit light.

FIG. 2 is a graph illustrating a curve of the driving current of the light source module in FIG. 1, against time. Referring to both FIG. 1 and FIG. 2, when the switch 140 is turned off, the driving current I1 is not conducted to the light source module 110, so that the light source module 110 is disabled. Here the light source module 110 does not generate any operating current and the power supply module 130 does not detect any feedback signal. Accordingly, the power supply module 130 misjudges that the driving current I1 it outputs is insufficient for driving the light source module 110 and continues to output the driving current I1.

Some energy-storage elements such as capacitors or inductors are usually disposed in the power supply module 130. Thus, when the switch 140 is turned off, the power supply module 130 is still in operation and the driving current I1 it outputs charges these energy-storage elements. When the switch 140 is turned on, the energy-storage elements transiently release the power they have stored, as a result, the quantity of the driving current transiently increases (as the portions enclosed by the dotted line 201 in FIG. 2), and accordingly colour temperature error is caused to the light source module 110 and power is wasted.

SUMMARY OF THE INVENTION

Accordingly, the present invention is directed to a backlight apparatus having high efficiency and stability.

The present invention is further directed to a driving method of a backlight apparatus which allows the backlight apparatus to have stable and accurate color temperature and reduced power consumption.

According to one aspect of the present invention, a backlight apparatus includes a light source module and a power supply module, wherein the light source module is composed of a plurality of light sources, and the power supply module generates a driving signal for driving the light source module according to a synchronous control signal. In particular, according to this aspect, a first switch is disposed between the light source module and the power supply module, or between the last light source in the light source module and a reference voltage level, and the first switch is turned on/off according to the synchronous control signal. In addition, the backlight apparatus further includes a second switch which determines whether or not to couple a special function terminal of the power supply module to the reference voltage level according to the synchronous control signal so as to disable the driving signal without switching off the power supply.

According to another aspect of the present invention, a driving method for a backlight apparatus is provided. The method includes generating a synchronous control signal and providing a reference voltage level. In addition, a driving signal is generated, and a light source is driven to emit light based on the voltage difference between the voltage level of the driving signal and the reference voltage level. In particular, with the present invention, whether or not to conduct the driving signal or the reference voltage level to the light sources in order to drive the light sources is determined according to the synchronous control signal. Further, with the present invention, whether or not to disable the driving signal synchronously without power off is also determined according to the synchronous control signal.

According to yet another aspect of the present invention, a liquid crystal display (LCD) having foregoing backlight apparatus is provided.

In the present invention, a driving signal or a reference voltage level can be conducted to a light source module and the driving signal can be synchronously disabled without power off. Accordingly, the backlight apparatus in the present invention has stable color temperature and low power consumption.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
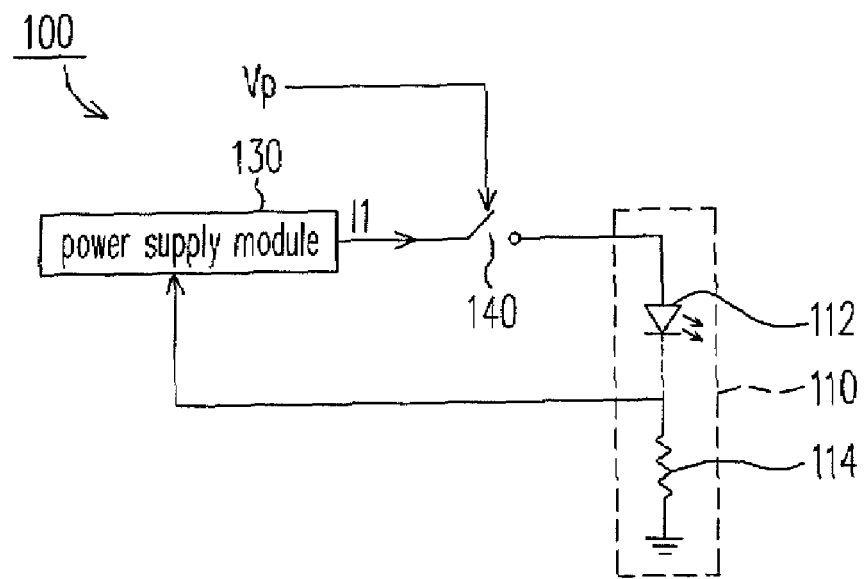
FIG. 1 is a block diagram illustrating the internal circuit of a conventional backlight apparatus.
Figure 2:
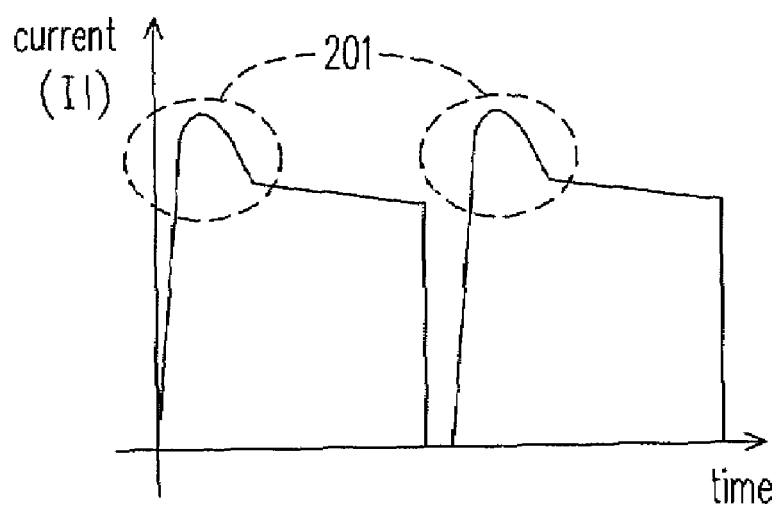
FIG. 2 is a graph illustrating driving current of the light source module in FIG. 1 against time.

Reference will now be made in detail to the preferred embodiments of the invention, examples of which are illustrated in the accompanying drawings. Wherever possible, the same reference numbers are used in the drawings and the description to refer to the same or like parts.

Embodiments of the present invention are described below by referring to accompanying figures. It should be stated here that various changes in form and details may be made to these embodiments of the present invention without departing the spirit and scope of the present invention as defined by the following claims. The following embodiments are only described to make those skilled in the art understand the present invention easily. The sizes of the accompanying figures are enlarged correspondingly to be viewed clearly, wherein like reference numerals refer to the like elements throughout. Moreover, the transistors in the figures are only used for the purpose of description and those skilled in the art should be able to use different types of transistors according to the actual implementation requirement.

Figure 3:
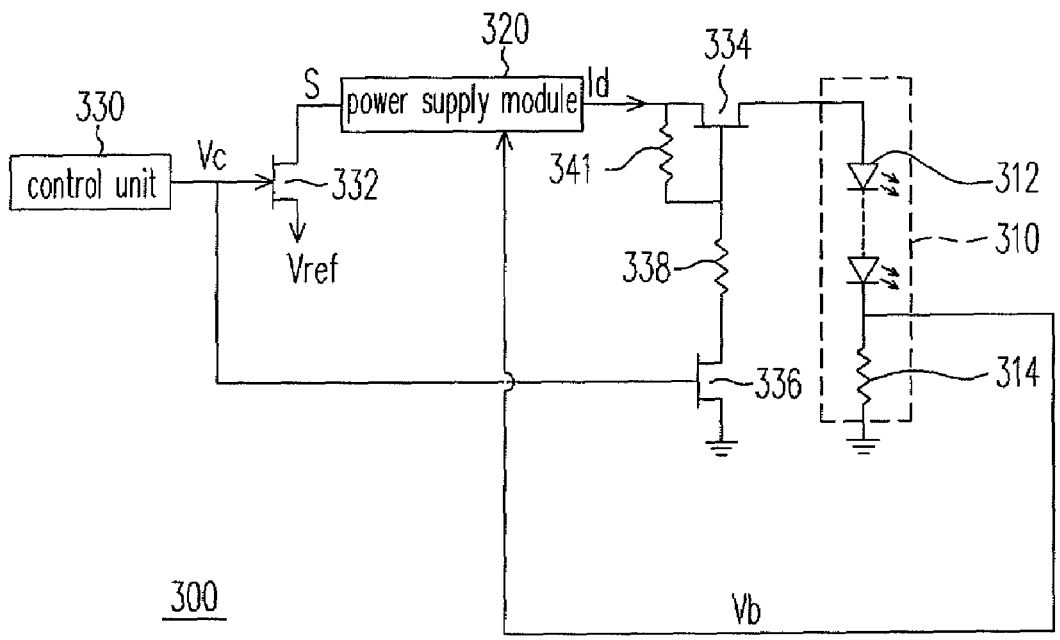
FIG. 3 is a circuit diagram illustrating the circuit of a backlight apparatus according to a first embodiment of the present invention.

FIG. 3 is a block diagram illustrating the circuit of a backlight apparatus according to a first embodiment of the present invention. Referring to FIG. 3, the backlight apparatus 300 in the present embodiment is suitable for a liquid crystal display (LCD), and the backlight apparatus 300 includes a light source module 310 which is composed of a plurality of light sources 312. In the present embodiment, the light sources 312 may be light emitting diodes (LEDs), wherein the cathode of each LED is coupled to the anode of the next LED, and the cathode of the last LED is grounded via a resistor 314. It should be understood by those skilled in the art that the light sources 312 in the present embodiment may be connected in series, parallel, or both.

Besides, the backlight module 300 further includes a power supply module 320, and the power supply module 320 generating a driving signal Id according to a feedback voltage Vb of the light source module 310 for driving the light source module 310 to emit light. In embodiments of the present invention, the driving signal Id may be a current signal. In particular, the power supply module 320 may have a special function terminal S. The power supply module 320 outputs the driving signal Id when the special function terminal S is enabled. In the present embodiment, the special function terminal S of the power supply module 320 is coupled to a reference voltage level Vref, such as the ground voltage level, via a switch 332. In addition, the switch 332 is turned on/off according to a synchronous control signal Vc.

In the present embodiment, the switch 332 can be implemented with a NMOS transistor. In this arrangement, the NMOS transistor has a first source/drain coupled to a reference voltage level Vref, a second source/drain coupled to the special function terminal S of the power supply module 320, and a gate receiving the synchronous control signal Vc.

Additionally, another switch 334 may be further disposed between the power supply module 320 and the light source module 310. The switch 334 determines whether to conduct the driving signal Id to the light source module 310 according to the synchronous control signal Vc. In the present embodiment, the switch 334 may also be implemented with a NMOS transistor, wherein the first source/drain of the switch 334 receives the driving signal Id output by the power supply module 320, the second source/drain thereof is coupled to the anode of a LED in the light source module 310, and the gate of the switch 334 is coupled to the first source/drain thereof via a resistor 341.

In the backlight module 300, a switch 336 may be further disposed between the synchronous control signal Vc and the switch 334. Similarly, the switch 336 may be implemented with a NMOS transistor, wherein the first source/drain of the switch 336 is grounded, the gate thereof receives the synchronous control signal Vc, and the second source/drain thereof is coupled to the gate of the switch 334 via a resistor 338.

Figure 4:
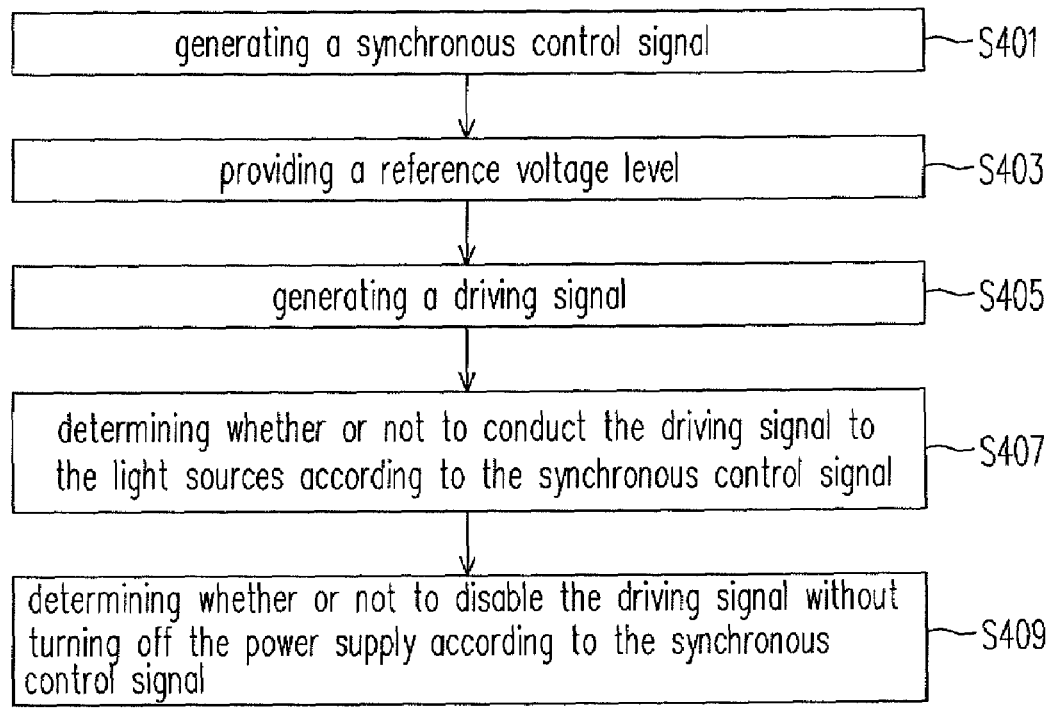
FIG. 4 is a flowchart illustrating a driving method of a backlight apparatus according to the first embodiment of the present invention.

FIG. 4 is a flowchart illustrating a driving method of a backlight apparatus according to the first embodiment of the present invention. Referring to both FIG. 3 and FIG. 4, first, in step S401, a control unit 330 generates a synchronous control signal Vc for controlling the switch 332 and the switch 336. Then, in step S403, a reference voltage level Vref, such as a ground voltage level, is provided to the first source/drain of the switch 332. Next, in step S405, the power supply module 320 generates a driving signal Id. In addition, as in step S407, the switch 334 determines whether or not to conduct the driving signal Id to the light source module 310 according to the synchronous control signal Vc, and as in step S409, the switch 332 determines whether or not to couple the special function terminal S of the power supply module 320 to ground according to the synchronous control signal Vc.

To drive the light source module 310 to emit light, the control unit 330 outputs a synchronous control signal Vc at a high voltage level. Here the switches 332 and 336 are both turned on. Since the switch 332 is turned on, the special function terminal S of the power supply module 320 is grounded, and accordingly the power supply module 320 outputs the driving signal Id. In addition, since the switch 336 is turned on, the gate of the switch 334 is grounded via the resistor 338, so that the switch 334 is turned on and accordingly the driving signal Id is conducted to the light source module 310 and drives the light sources 312 to emit light.

When the synchronous control signal Vc is at a low voltage level, the switches 332 and 336 are both turned off. Here the special function terminal S is floated so that the power supply module 320 disables the driving signal Id without the power supply being turned off. Besides, the switch 334 is also turned off because of the turnoff of the switch 336, and which causes the light source module 310 to be disabled.

Since, in the present invention, the driving signal Id and the light source module 310 can be disabled synchronously, transient increase in the quality of the driving signal Id due to overcharge of energy-storage elements will not be caused in accordance with the present invention. Accordingly, the backlight apparatus in the present invention has high stability and low power consumption.

Moreover, in the present invention, the driving signal Id can be disabled without powering off, therefore the driving signal Id has very short transition time when it transits from one status to another status.

Figure 5:
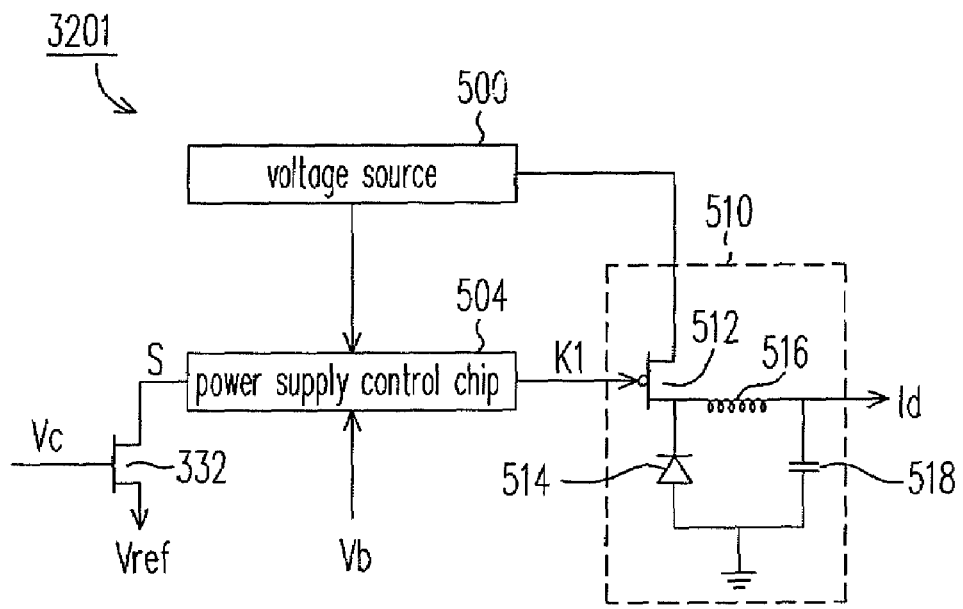
FIG. 5 is a circuit diagram of a power supply module according to a second embodiment of the present invention.

FIG. 5 is a circuit diagram of a power supply module according to an embodiment of the present invention. Referring to FIG. 5, the power supply module 3201 includes a voltage source 500, a power supply control chip 504, and a voltage dropping loop 510. The power supply control chip 504 has an aforementioned special function terminal S which is coupled to the reference voltage level Vref via the switch 332, and the output K1 of the power supply control chip 504 is coupled to the voltage dropping loop 510. Accordingly, the power supply control chip 504 can control the voltage dropping loop 510 to output the driving signal Id when the switch 332 is turned on.

The voltage dropping loop 510 includes a PMOS transistor 512, wherein the first source/drain of the PMOS transistor 512 is coupled to the cathode of a diode 514 and is grounded via the diode 514, and the gate of the PMOS transistor 512 receives the output K1 of the power supply control chip 504. In addition, the second source/drain of the PMOS transistor 512 is coupled to the voltage source 500. In addition to this, the power supply module 3201 further includes an inductor 516, wherein one end of the inductor 516 is coupled to the second source/drain of the PMOS transistor 512 and anther end thereof is grounded via a capacitor 518.

Figure 6:
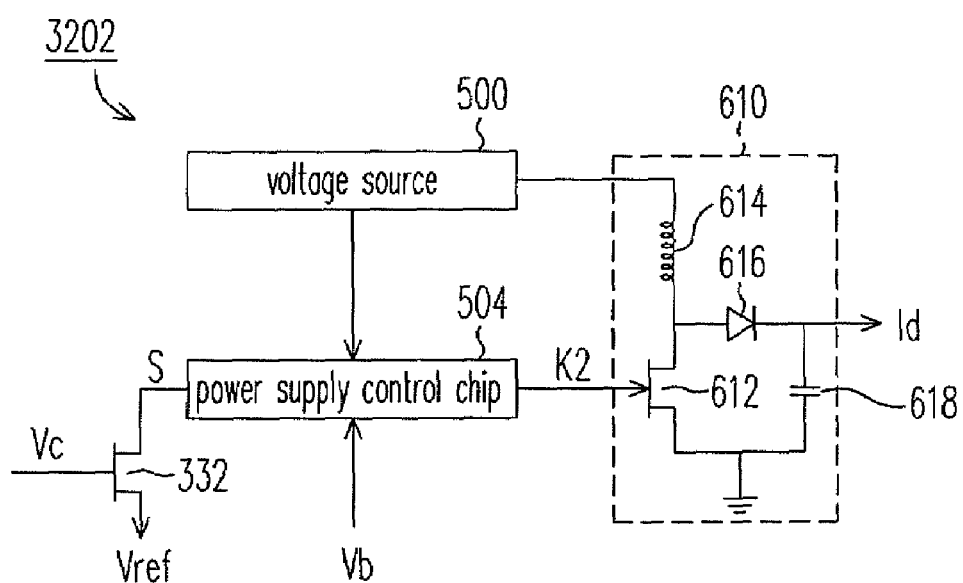
FIG. 6 is a circuit diagram of a power supply module according to another embodiment of the present invention.

FIG. 6 is a circuit diagram of a power supply module according to another embodiment of the present invention. Referring to FIG. 6, similarly, the power supply module 3202 also includes a voltage source 500 and a power supply control chip 504. In addition, the power supply module 3202 further includes a voltage boosting loop 610. The power supply control chip 504 also has a special function terminal S, and the output K2 thereof is coupled to the voltage boosting loop 610.

The voltage boosting loop 610 includes a NMOS transistor 612, wherein the first source/drain of the NMOS transistor 612 is grounded, the gate thereof receives the output K2 of the power supply control chip 504, and the second source/drain thereof is coupled to the voltage source 500 via an inductor 614. In addition, the second source/drain of the NMOS transistor 612 is coupled to the anode of a diode 616, and the cathode of the diode 616 is grounded via a capacitor 618. As described above, the power supply control chip 504 can control the voltage boosting loop 610 to output a driving signal Id according to the synchronous control signal Vc.

Figure 7:
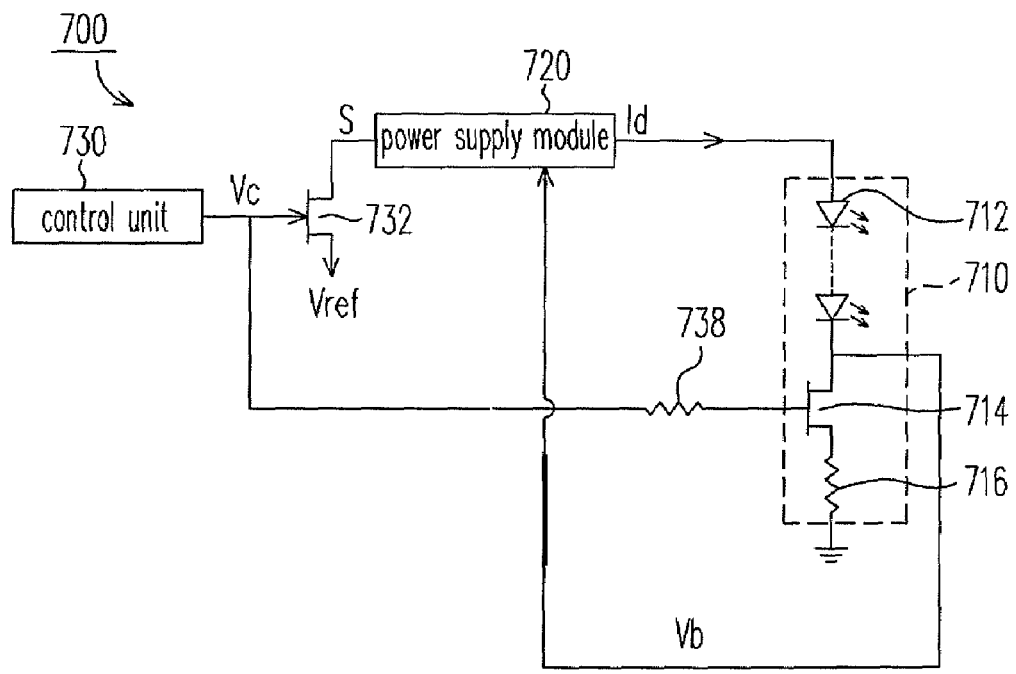
FIG. 7 is a circuit diagram of a backlight apparatus according to a further embodiment of the present invention.

FIG. 7 is a circuit diagram of a backlight apparatus according to a second embodiment of the present invention. Referring to FIG. 7, the backlight apparatus 700 also includes a light source module 710 which is composed of a plurality of light sources 712, such as LEDs, connected in series, wherein the cathode of each LED is coupled to the anode of the next LED, and the anode of the first LED receives a driving signal Id.

In this arrangement, the cathode of the last LED in the light source module 710 is coupled to a resistor 716 via a switch 714 and is grounded via the resistor 716.

In the present embodiment, the switch 714 can be implemented with a NMOS transistor. The first source/drain of the switch 714 is grounded via the resistor 716, and the second source/drain thereof is coupled to the cathode of the last LED in the light source module 710. In addition, the gate of the switch 714 is coupled to the gate of a switch 732 via a resistor 738 for receiving a synchronous control signal Vc.

Referring to FIG. 7 again, similarly, the backlight apparatus 700 includes a power supply module 720 which generates the driving signal Id to the light source module 710 according to a feedback voltage Vb of the light source module 710. The power supply module 720 also has a special function terminal S, and the special function terminal S is coupled to a reference voltage level Vref, such as the ground, via the switch 732. The power supply module 720 generates the driving signal Id when the switch 732 turns on to ground the special function terminal S. Reference should be had to the description of the embodiment illustrated in FIG. 5 and FIG. 6 regarding the circuit structure of the power supply module 720.

Figure 8:
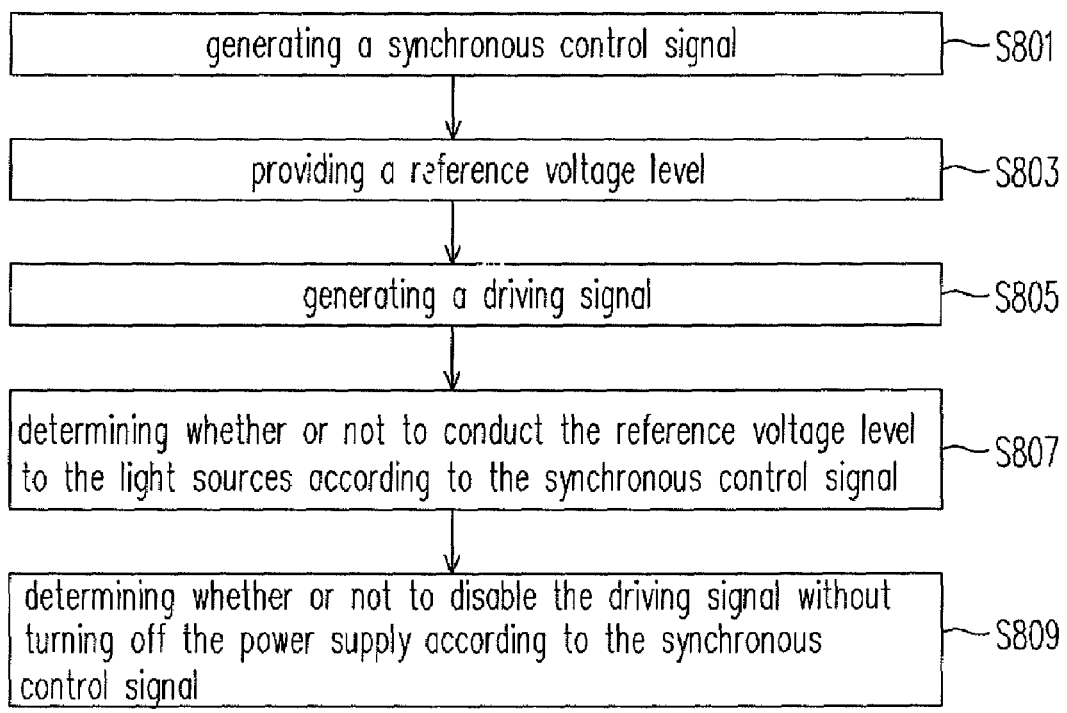
FIG. 8 is a flowchart illustrating a driving method of a backlight apparatus shown in FIG. 7.

FIG. 8 is a flowchart illustrating a driving method of a backlight apparatus according to the second embodiment of the present invention. Referring to both FIG. 7 and FIG. 8, similarly, a control unit 730 is disposed in the backlight apparatus 700 for generating the synchronous control signal Vc, as in step S801. In addition, the backlight apparatus 700 also provides a reference voltage level, such as a ground level, as in step S803.

In addition, the power supply module 720 generates the driving signal Id in step S805. When the power supply module 720 generates the driving signal Id, the switch 714 determines whether or not to ground the light sources 712 according to the synchronous control signal Vc, as in step S807.

More specifically, when the control unit 730 outputs a synchronous control signal Vc at a high voltage level, the switches 732 and 714 are both turned on. Here the special function terminal S of the power supply module 720 is grounded, so that the power supply module 720 generates the driving signal Id and transmits it to the light source module 710. In addition, since the switch 714 is turned on, the light source module 710 is grounded and accordingly it responds to the driving signal Id and starts to emit light.

The switches 732 and 714 are both turned off when the synchronous control signal Vc is at a low voltage level. In this situation, the special function terminal S of the power supply module 720 is floated, and accordingly the power supply module 720 disables the driving signal Id without power off as described in step S809. In addition, since the switch 714 is turned off, the light sources 712 are not grounded, and because the driving signal Id is disabled, the light source module 710 is also disabled.

In summary, in the present invention, switches are disposed at the front or back ends of the light sources and on the special function terminal of the power supply module, and these switches are turned on/off according to a synchronous control signal. Thus, the backlight apparatus provided by the present invention has high stability and low power consumption.

Moreover, in foregoing description, the switches are only disposed at the front or back ends of the light sources, nevertheless, switches may, as will be readily understood by those skilled in the art to which this invention pertains or most closely pertains, also be disposed at both the front and back ends of the light sources without departing the spirit of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight apparatus, comprising:
   a light source module, having a plurality of light sources connected in series;
   a power supply module for generating a driving signal according to a synchronous control signal, wherein the driving signal is configured to drive the light source module to emit light;
   a first switch, disposed between a last light source in the light source module and a reference voltage level, wherein the first switch is configured to turn on or off according to the synchronous control signal; and
   a second switch, for determining whether or not to couple a special function terminal of the power supply module to the reference voltage level in order to disable the driving signal without power off the power supply module according to the synchronous control signal.

2. The backlight apparatus according to claim 1, wherein the first switch is a NMOS transistor having a gate coupled to the reference voltage level via the second switch, and a first source/drain and a second source/drain coupled to the last light source and ground, respectively.

3. The backlight apparatus according to claim 1, wherein the reference voltage level is ground voltage level.

4. The backlight apparatus according to claim 1, wherein the light sources are LEDs, and the cathode of each of the LEDs is coupled to the anode of a next LED.

5. The backlight apparatus according to claim 1, wherein the light sources are connected in series.

6. A backlight apparatus, comprising:
   a light source module, having a plurality of light sources connected in series;

a power supply module, for generating a driving signal according to a synchronous control signal for driving the light source module;

a first switch, disposed between a first light source of the light source module and the power supply module, wherein the first switch is configured to pass the driving signal to the light source module according to the synchronous control signal; and a second switch, for determining, according to the synchronous control signal, whether or not to couple a function terminal of the power supply module to a reference voltage level in order to disable the driving signal.

7. The backlight apparatus according to claim 6, further comprising a third switch for controlling the first switch according to the synchronous control signal;

wherein the first switch is a NMOS transistor having a first source/drain for receiving the driving signal, a second source/drain coupled to the light source module, and a gate controlled by the third switch.

8. The backlight apparatus according to claim 7, wherein the third switch is a NMOS transistor, that includes a grounded first source/drain, a gate for receiving the synchronous control signal, and a second source/drain connected to the gate of the first switch via a resistor.

9. The backlight apparatus according to claim 6, wherein the reference voltage level is ground voltage level.

10. The backlight apparatus according to claim 6, wherein the light sources are light emitting diodes (LEDs), and each cathode of the LEDs is coupled to the anode of a next LED.

11. A driving method of a backlight apparatus, wherein the backlight apparatus has a plurality of light sources and a power supply module, and the driving method comprises:

generating a synchronous control signal;

providing a reference voltage level:

generating a driving signal, wherein the light sources are driven according to the voltage difference between the voltage level of the driving signal and the reference voltage level;

determining whether or not to conduct the driving signal to the light sources according to the synchronous control signal; and determining, according to the synchronous control signal, whether or not to disable the driving signal without powering off the power supply module.

12. The driving method according to claim 11, wherein the reference voltage level is ground voltage level.

13. The driving method according to claim 11 configured for controlling the backlight of a liquid crystal display (LCD).

* * * * *